(12) United States Patent
Grob

(10) Patent No.: US 9,878,409 B2
(45) Date of Patent: Jan. 30, 2018

(54) MACHINE TOOL FOR MACHINING

(71) Applicant: Grob-Werke GmbH & Co. KG, Mindelheim (DE)

(72) Inventor: H. C. Burkhart Grob, Bad Woerishofen (DE)

(73) Assignee: GROB-WERKE GMBH & CO. KG, Mindelheim (DE)

( * ) Notice: Subject to any disclaimer, the term of this patent is extended or adjusted under 35 U.S.C. 154(b) by 0 days.

(21) Appl. No.: 14/909,452

(22) PCT Filed: Jul. 31, 2014

(86) PCT No.: PCT/EP2014/066517
§ 371 (c)(1),
(2) Date: Feb. 1, 2016

(87) PCT Pub. No.: WO2015/014948
PCT Pub. Date: Feb. 5, 2015

(65) Prior Publication Data
US 2016/0193704 A1    Jul. 7, 2016

(30) Foreign Application Priority Data

Aug. 1, 2013 (DE) .......................... 10 2013 108 312
Dec. 23, 2013 (DE) .......................... 10 2013 114 836

(51) Int. Cl.
*B23C 1/12* (2006.01)
*B23Q 1/48* (2006.01)
(Continued)

(52) U.S. Cl.
CPC .......... *B23Q 1/4804* (2013.01); *B23Q 1/015* (2013.01); *B23Q 1/017* (2013.01); *B23Q 1/4852* (2013.01);
(Continued)

(58) Field of Classification Search
CPC ...... B23C 1/12; B23Q 1/4804; B23Q 1/4852; B23Q 1/4866; B23Q 2210/006;
(Continued)

(56) References Cited

U.S. PATENT DOCUMENTS 2,086,583 A * 7/1937 Strawn .................... B23B 39/16
29/26 R
2,750,851 A * 6/1956 Berthiez ................. B23B 39/02
408/237

(Continued)

FOREIGN PATENT DOCUMENTS

DE        10027509 A1    12/2001
DE    102011003009 A1 *  7/2012  ............... B23C 1/12
(Continued)

*Primary Examiner* — Daniel Howell
(74) *Attorney, Agent, or Firm* — Loginov & Associates; William A. Loginov

(57) ABSTRACT

The present invention relates to a machine tool for machining a workpiece. The machine tool has a motor spindle for the rotative actuation of a tool. The motor spindle is supported by a stand. A turning bearing is provided at the stand and the motor spindle at the turning bearing is pivotable and positionable about a first turning axis. At the motor spindle, a linear guide is provided, which enables an advancing movement of the tool parallel to the spindle axis.

15 Claims, 10 Drawing Sheets

(51) Int. Cl.
*B23Q 3/157* (2006.01)
*B23Q 1/01* (2006.01)

(52) U.S. Cl.
CPC ....... *B23Q 1/4866* (2013.01); *B23Q 3/15713* (2013.01); *B23C 1/12* (2013.01); *B23Q 2220/006* (2013.01); *Y10T 409/307672* (2015.01); *Y10T 409/308232* (2015.01); *Y10T 483/175* (2015.01); *Y10T 483/1745* (2015.01)

(58) Field of Classification Search
CPC . Y10T 409/307672; Y10T 409/308232; Y10T 409/308512; Y10T 409/309576
See application file for complete search history.

(56) References Cited

U.S. PATENT DOCUMENTS

| | | | | |
|---|---|---|---|---|
| RE26,393 E | * | 5/1968 | Daugherty | B23Q 35/00 408/234 |
| 3,413,893 A | * | 12/1968 | Wilson | B23C 1/12 409/201 |
| 3,483,796 A | * | 12/1969 | Galbarini | B23Q 1/0009 408/238 |
| 3,650,178 A | * | 3/1972 | Appleton | B23Q 1/015 408/236 |
| 4,190,948 A | * | 3/1980 | Kielma | B23Q 1/52 483/30 |
| 5,084,951 A | * | 2/1992 | Bonomi | B23Q 1/48 29/26 A |
| 5,238,340 A | * | 8/1993 | Ochiai | B23Q 11/0028 409/201 |
| 5,865,576 A | * | 2/1999 | Arai | B23Q 1/5462 219/121.67 |
| 6,357,094 B1 | * | 3/2002 | Sugimoto | B23Q 1/012 29/26 A |
| 8,082,642 B1 | | 12/2011 | McCulloch | |
| 2003/0180107 A1 | * | 9/2003 | Lutz | B23B 39/167 408/39 |
| 2005/0034290 A1 | * | 2/2005 | Sobrito | B23Q 1/017 29/56.5 |
| 2016/0176002 A1 | * | 6/2016 | Grob | B23Q 1/4804 409/185 |

FOREIGN PATENT DOCUMENTS

| | | | | |
|---|---|---|---|---|
| EP | 1114694 A1 | | 4/2004 | |
| EP | 2332692 A1 | | 6/2011 | |
| FR | 2473925 A1 | * | 7/1981 | ............ B23C 1/002 |
| FR | 2694720 A1 | * | 2/1994 | ............ B23Q 1/012 |
| FR | 2926740 A1 | | 7/2009 | |
| JP | 58077420 A | * | 5/1983 | ........... B23Q 11/001 |
| JP | 61241055 A | | 10/1986 | |
| JP | 2003094268 A | | 4/2003 | |
| JP | 2006263847 A | * | 10/2006 | |
| JP | 2007152467 A | * | 6/2007 | |
| JP | 2007296596 A | | 11/2007 | |
| SU | 1060397 A1 | * | 12/1983 | ............... B23Q 1/48 |
| WO | WO 2013057327 A1 | * | 4/2013 | ........... B23Q 1/4866 |

\* cited by examiner

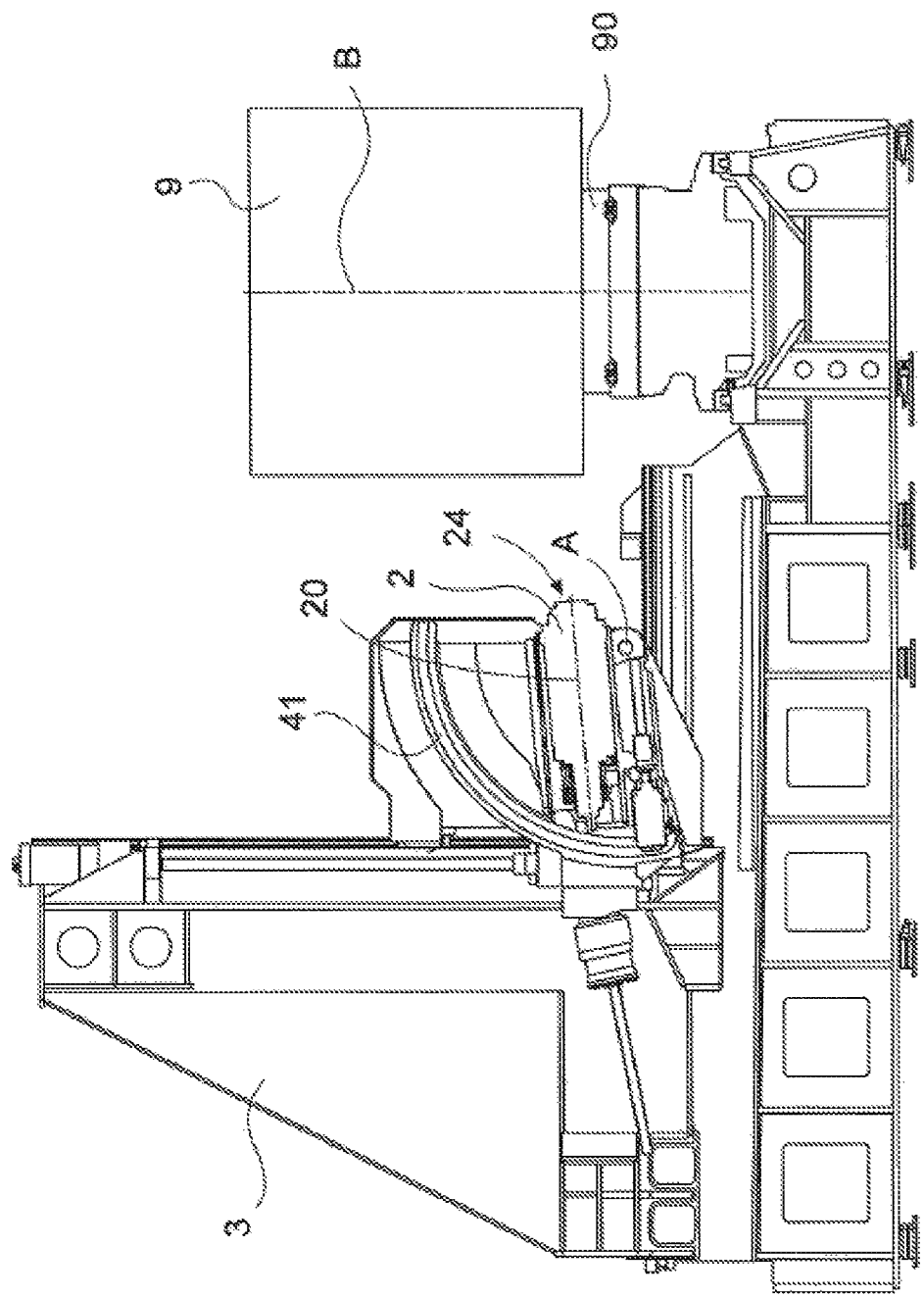

MACHINE TOOL FOR MACHINING

The invention relates to a machine tool for machining a workpiece, the machine tool having a motor spindle for the rotative actuation of a tool about a spindle axis and the motor spindle being supported by a stand.

Generic machine tools are well known. They are often used to carry out a plurality of complicated machining processes at workpieces, for example, at cylinder heads or gearboxes. For this purpose, generic machine tools are used as part of production lines, which are linked through respective chain or transport means, or are also used as stand-alone universal machines. In order to effectively machine the workpiece, it is advantageous for this purpose that the workpiece can be positioned and machined with high precision along a plurality of axes relative to the tool. In this instance, it is also known to divide the linear and turning axes between the workpiece and the motor spindle. The machining is, for example, carried out by a dr lung or milling tool supported and actuated by a motor spindle. In this instance, a Cartesian configuration is often chosen, that is, the three mutually perpendicular spatial axes also describe the three linear axes along which the tool and/or tools is/are positionable. In addition, turning axes are also provided to prevent a re-clamping of the workpiece, for example, in multi-sided machining, which respectively shortens the machining time of a workpiece.

It is the object of the present invention to improve the known machine tools in that they can be more flexibly used and more cost-effectively implemented.

This object is achieved by the machine tool according to Claim 1. Preferred embodiments of the present invention are the subject matter of the dependent claims.

Subject matter of the application is a machine tool at the stand of which a turning bearing is provided, and the motor spindle at the turning bearing is pivotable or positionable about a first turning axis, and a linear guide is provided at the motor spindle, which enables an advancing movement of the tool parallel to the spindle axis.

It is evident that, in order to position the motor spindle about a first turning axis of the turning bearing, a corresponding turning actuator is provided for movement and positioning.

It is known from the prior art to implement the turning axes in the workpiece table. In particular in the case of large, heavy workpieces, this leads to a considerable design engineering complexity. The great mass of the workpiece is to be considered accordingly when designing this rotational axis, leading to respective complexity. Ultimately, this rotational axis only provides a relative position of the workpiece to the spindle axis of the motor spindle or to the tool, the advantage of moving a significantly smaller mass resulting in this instance, which is cost effective during implementation, but also more cost effective when operating the machine tool according to the present invention.

The machine tool can be modified to the effect that a turning bearing is provided at the stand, and that the motor spindle at the turning bearing is pivotable and positionable about a first turning axis by means of a controllable turning actuator, and that a linear guide is provided at the motor spindle, which enables a linear movement of the tool parallel to the spindle axis by means of a controllable linear actuator, and that the rotary movement and the linear movement are overlaid during machining.

Overlaying the rotary movement and the linear movement results in a higher flexibility of the machine tool according to the present invention, this flexibility being implemented by small-sized and, for this reason, cost effective actuators because the masses to be moved are small. On the one hand, only the mass of the motor spindle has to be rotated and, on the other hand, also only a part of the mass of the motor spindle has to be linearly moved. The turning actuator and the linear actuator, both are respectively controllably equipped and, in this way, allow for a very high machining accuracy. With the aid of NC controls known from the prior art, which are used as machine controls, even highly complex machining can be carried out in a cost effective manner.

Alternatively, the machine tool can also be modified to that effect that a turning bearing is provided at the stand, and that the motor spindle at the turning bearing is pivotable or positionable about a first turning axis, and that a linear guide is provided at the motor spindle, which enables an advancing movement of the tool parallel to the spindle axis, and that the machine tool has a workpiece support, which is movable and positionable along a preferably horizontally oriented workpiece guide describing a first linear axis, and that a guide or a double guide for the turning bearing is provided at the stand in the direction of a preferably vertically oriented second linear axis, and that the turning bearing is movable and positionable along this guide or double guide, and that in particular the workpiece support is rotatable and positionable about a second turning axis. This manner at implementation divides the respective linear axes into a movement of the tool and into a movement of the workpiece support. Thus, the respective design engineering complexity is reduced because the design engineering implementation of different movements or turning axes in different elements is ultimately less expensive than the implementation of a linear and turning axis in one element. On the side of the tool, thus, at the stand, two linear movements and one rotary movement are provided in this instance. The workpiece is movable at least along one linear axis. In an improved proposal, a turning axis is also provided for the workpiece, it being here provided that a second, vertically oriented turning axis is implemented, as a result of which the workpiece is rotatable and positionable in a horizontal plane. Such a concept is particularly desirable for heavy workpieces, the lifting of which requires significant force and also energy. In such application cases it is more suitable to position the axis consuming gravitational potential energy in the lighter element, in this case, in the motor spindle.

Furthermore, it is provided that a linear guide is provided in the motor spindle, which enables an advancing movement of the tool, for example, parallel to the spindle axis. Suitably, a linear guide is provided at the motor spindle, which enables a linear movement of the tool parallel to the spindle axis by a controllable linear actuator. The, for example, spindle sleeve-like embodiment has significant advantages because the motor spindle is only to be moved along one axis to cause the feed of the tool in the workpiece. Again, the masses to be moved are very small, that is, relatively small and low-cost actuators make it possible to reach high speeds and high efficiency.

The mobility of the motor spindle along the linear guide, realized by the own actuator, provides an efficient solution in each rotation angle position of the motor spindle relative to the turning axis. In this instance, only masses which are actually needed for the advancing movement are moved. As it is provided by the well-known overlaying of the movement of two axes in the prior art, the stand and/or other heavy elements of the machine tool do not have to be moved for this purpose. In this instance, overlaying two independent movements results in a consequential movement; however, two actuators have to be activated and respectively large masses have to be moved, resulting in higher costs and inferior efficiency and accuracy.

Furthermore, a combination having a turning or rotational axis of the workpiece is enabled in the workpiece table. In doing so, multi-sided machining is made possible with little effort and at oblique angles.

Furthermore, the proposal advantageously provides that a linear guide is provided at the motor spindle, which enables a linear movement of the tool parallel to the spindle axis by a controllable linear actuator.

In a preferred embodiment of the proposal, it is provided that a rotary movement and a linear movement are overlaid during machining. The advantageously proposed overlaying of the rotary movement and the linear movement results in a higher flexibility of the machine tool, this flexibility being realized by small-sized and, for this reason, cost effective actuators because the masses to be moved are small. On the one hand, only the mass of the motor spindle has to be rotated and, on the other hand, also only a part of the mass of the motor spindle has to be linearly moved. The turning actuator and the linear actuator, both are respectively controllably equipped and, in this way, allow for a very high machining accuracy. With the aid of NC controls known from the prior art, which are used as machine controls, even highly complex machining can be carried out in a cost effective manner. In this instance, it is to be noted that the term linear movement encompasses advancing motion and retracting motion, the advancing or retracting being with reference to a movement in the direction of the workpiece or away from the workpiece.

Furthermore, it is provided that when the spindle axis is horizontally aligned, the turning axis of the turning bearing is located below the spindle axis. Conventionally it is provided that the turning axis and the spindle axis are oriented perpendicular to each other. This, however, does not automatically entail that the turning axis and the spindle axis have to intersect. The position of the axes is variably selectable in such a manner that the turning axis and the spindle axis intersect; in a different variation, the turning axis is situated above the spindle axis or, as preferably embodied, the turning axis is situated below the spindle axis. Such an embodiment is particularly advantageous when a machining of the workpiece is to be carried out from above, thus, a machining, for example, in the vertical direction from the top to the bottom. Since the turning axis is, in this case, situated below the spindle axis, no stroke length is wasted in the vertical direction by the rotary movement.

An advantageous embodiment provides that the turning axis is in the vicinity of the tool holder of the retracted motor spindle. At its end facing the workpiece, the motor spindle has a tool holder formed by a clamping device, which holds on to the tool. Furthermore, it is provided that the motor spindle has a linear guide running parallel to the spindle axis, the linear guide enabling a controllable turning actuator to position the tool parallel to the spindle axis. By positioning the tool, the tool holder is of course also correspondingly moved and positioned. Thus, the tool assumes relative to the workpiece a forward or retracted end position. The retracted position of the motor spindle thus describes the position of the motor spindle in which the tool is maximally removed from the workpiece. In one exemplary embodiment, the position of the turning axis relative to the tool holder is described by an axial position with reference to the spindle axis and by a radial position also with reference to the spindle axis. In this exemplary proposal, the turning axis lies maximally one to two diameters of the motor spindle below the spindle axis. The axial position is, for example, defined over the total length of the retracted, thus, the non-extended motor spindle, for example, between 0 and 50% of this length with reference to the front end of the motor spindle of the tool holder. In this instance, the axial length of the turning axis can be between the center of the motor spindle and the tool holder, as it can also be in front of the tool holder, as a result of which the motor spindle is folded up during pivoting, particularly when in the vertical position, as a result of which stroke length is gained in the vertical direction.

Preferably, the turning axis of the turning bearing thus lies in the front, near the tool holder, below the spindle axis. The position of the turning axis in the front, near the tool holder and below the spindle axis results in that the transverse forces arising, for example, when milling with a cutter head, only produce small moments. In order to achieve a high machining accuracy, these moments have to be reliably braced. Moreover, the spindle axis approaches the workpiece when pivoting in the vertical position; for example, this is the case when the turning axis does not extend over the front end of the tool holder. Thus, the distance from the spindle nose (of the tool holder) to the vertical guide is small in the horizontal direction; in the vertical position, machining can be carried out extending far over the center of the workpiece support.

A preferred variation provides that a guide for the turning bearing is provided at the stand in the direction of a second linear axis (Y) and that the turning bearing is movable and positionable along this guide. For the movement of the turning bearing along this second linear axis, an adjustable and controllable actuator is provided, by which a precise positioning of the turning bearing and, for this reason, also of the position of the motor spindle is achieved.

Conventionally, this second linear axis describes the vertical or Y-axis. In doing so, this proposal achieves that, due to the pivotability about the turning bearing, the motor spindle is adjustable and positionable in regard to its height position and inclination towards the horizontal.

Suitably, it is provided that the stand is formed by two stand parts spaced apart and that the turning bearing is synchronously movable and positionable on guides of the stand parts via guide slides. The embodiment having two stand parts spaced apart results in a high stability of the stand. In this instance, the turning bearing is braced on both stand parts via at least respectively one guide slide, each stand part having an own actuator which are synchronized with each other.

A further preferable embodiment provides that the turning bearing is situated between the two stand parts or between the single guides of the double guide. The two stand parts running parallel to each other describe one plane lee guide slides are, for example, situated at the stand parts on the respectively facing inner sides. Thus, the turning bearing is also located in or on the previously described plane. The machine tool according to the present invention is, however, not limited hereto. It is also possible that the turning bearing is situated in front of the previously described plane and forms a bridge-like link between the two stand parts.

Furthermore, it is proposed that the stand is movable and positionable along a guide describing a first linear axis. When specifying the geometry of the generic machine tool or the machine tool according to the present invention, the rotational axis of the motor spindle is selected parallel to one of the linear axes, which, however, does not limit the present invention. Of course, it is possible that the rotational axis of the motor spindle also forms an angle with the linear axes which preferably correspond to a Cartesian coordinate system. For a simple reference, it now shall be assumed that, at least in one position, the rotational axis of the motor spindle is parallel to a first linear axis, this first linear axis also being described in the nomenclature of the machine tool as Z-axis.

It is to be noted that the allocation of the individual linear axes is free. In a first variation, it is possible that the turning bearing is fixedly attached to the stand and all movements, in particular along the linear axes, are carried out by the workpiece. Conventionally, the first linear axis (Z-axis) is horizontally oriented and is reached by a linear guide, which is realized by at least two parallel running guide rails.

A further variation provides that the machine tool has a stand guide along a third linear axis for positioning the stand. In this exemplary embodiment, the motor spindle carries out all movements along the three spatial axes, the first (Z) axis and the third (X) linear axis lying in one horizontal plane. The inclinability of the motor spindle about a first turning axis achieves that also (vis-à-vis the horizontal) oblique machining is possible.

In addition to the concentration of all movements along the linear axes in the motor spindle, it is of course also possible to distribute this mobility between the motor spindle and the workpiece, particularly a workpiece support supporting the workpiece. Herefrom results the further proposal that the machine tool has a workpiece support and the workpiece support is movable and positionable along a workpiece guide describing a third linear axis.

Alternatively or additionally, it is also provided that the arrangement of the workpiece support is selectable in such manner that it also is movable and positionable along a workpiece guide describing a first linear axis (Z). For the respective workpiece guide along the first (Z) linear axis and/or the third (X) linear axis lying preferably on the horizontal plane, controllable and adjustable actuators are respectively provided.

For the mobility or positionability of the individual elements on their respective guides, actuators, preferably electric motors, are provided. Said actuators are respectively outfitted with high-precision positioning sensors and control algorithms to achieve a fast and highly precise positioning of the motor spindle relative to the workpiece, realized by positioning the stand and/or the motor spindle and/or the position of the motor spindle about the turning axis and/or the position of the workpiece support supporting the workpiece. This characteristic applies to all movements along the linear axes, regardless whether the movement of the motor spindle, the stand or the workpiece support, and also to each, turning, rotational or pivoting movement of a member about a corresponding turning or rotational axis.

A further variation provides that the workpiece support is rotatable and positionable about a second turning axis. In this instance, the second turning axis is parallel to the second linear axis and is preferably vertically oriented. As a result, a multi-sided machining of the once clamped workpiece is achieved.

Advantageously, the motor spindle has a spindle sleeve which is mounted on the linear guide in the direction of the spindle axis and which is displaceable and positionable vis-à-vis the motor spindle housing. A spindle sleeve enables an axial movement of the tool in the direction of the rotational axis of the tool. Hence, the spindle sleeve or tool spindle sleeve enables two movements, the rotational movement of the tool and, furthermore, an independent linear movement to respectively advance the tool. Implementing the spindle sleeve at the motor spindle enables in a simple manner to move the tool, which is situated at the motor spindle pivoting about the turning bearing, toward the workpiece, and, owing to this independent actuation, a significantly lower weight has to be moved and, by means of this feed axis of the motor spindle, fast movements for machining, in particular, for smaller drillings and also for replacing tools, are possible.

Furthermore, it is advantageously provided that, in addition to the first motor spindle, at least one further motor spindle is disposed, which is pivotable and positionable about the first turning axis at the turning bearing. By disposing further motor spindles on the turning bearing which is pivotable and positionable about the turning axis in the same manner, it is possible to simultaneously machine a plurality of (similar or also different) workpieces by means of a machine tool equipped in such a manner, as a result of which the cutting capacity is accordingly increased.

Advantageously, it is provided that the respective spindle axes of the at least two motor spindles are oriented parallel to each other. It is often advantageous to carry out similar machining steps at the same workpieces (or at one workpiece) by means of machine tools equipped as previously described. In such a case, it is advantageous to orient the spindle axes of the at least two motor spindles in a parallel manner, as a result of which respective linear actuators also do not have to be redundantly held available, leading to a reduction in mass. Given an appropriate process planning, it may also be advantageous that the spindle axes of the motor spindles are differently oriented to one another because they, for example, carry out different processes at different or identical workpieces.

Furthermore, it is advantageously provided that an adjusting device is provided to adjust the distance between the motor spindles. For this purpose, the adjusting device comprises, for example, a corresponding guide and a locking mechanism fixing the motor spindles into the selected position. In this instance, the adjusting device is only manually actuatable because such an adjustment only occurs rarely or, however, such an adjusting device is implemented having an electrical, controllable actuator, as a result of which this adjustability becomes also available during machining.

A pivotable and positionable spindle bed is provided around the first turning axis. A correspondingly controllable and adjustable rotational actuator or turning actuator is provided for the rotary movement. The motor spindle is mounted via the linear guide in the direction of the spindle axis on or at the spindle bed.

Thus, the spindle bed describes a reception of the motor spindle at the turning bearing, the spindle bed not being limited to accommodating only one motor spindle. A preferred embodiment provides that the spindle bed accommodates at least two motor spindles.

Furthermore, it is provided that for the at least two motor spindles a common linear actuator is provided or that for each of the at least two motor spindles respectively one own linear actuator is provided. The use of a common linear actuator for a plurality of motor spindles has the advantage that the motor spindles, for example, form a unit which in itself is stiffer and more stable and that only one actuator is necessary. It is, however, also possible that each of the motor spindles situated at the spindle bed is assigned an own linear actuator, as a result of which then, for example, also movements independent from one another are possible.

One advantageous embodiment provides that the spindle bed is configured in a cage- or tunnel-like manner, in particular, in an integral or flexurally stable manner. A tunnel-like configuration of the spindle bed is, for example, shown in FIG. 7. Such a configuration is particularly flexurally stable, which is advantageous for a high machining accuracy.

Suitably, it is provided that the bearing element of the turning bearing is situated at the front end, particularly at the lower end of the spindle bed.

A further preferable embodiment provides that the spindle bed has clamping surfaces at the end of the spindle bed lying opposite of the bearing element. Thus, the spindle bed is, on the one hand, connected at the turning bearing and, on the other hand, connected to the turning bearing via the clamping surfaces and a clamping device thereon engaging. Since these two bearing areas are spaced relatively far apart, a correspondingly stable bearing results because a greater part of the motor spindle is situated between these two bearing areas.

A preferred variation is characterized by a center position of the spindle axis pivotable about the turning axis of the bearing, in which the spindle axis is parallel to the first linear axis (Z or horizontal axis) and is pivotable and positionable in a pivot range of −25° to +100°, preferably of −20° to +95°, preferably of −15° to +90°, vis-à-vis this center position. Generally, this pivot range is described by a lower and an upper limit. For example, the lower limit is −25°, −20°, −15°, −10°; the upper limit is +90°, +95°, +100°, +105°, +110°. The application discloses any combination of the lower and upper limit; the skilled person is aware how such a configuration of the pivot range is to be implemented at the turning bearing. For this purpose, negative angles describe a lifting or pivoting of the spindle axis upwards vis-à-vis the horizontal, as a result of which machining from below or diagonally below (in the upward direction) becomes possible. Positive angles lower the spindle head and the tool thereon attached, as a result of which machining from above or diagonally above (in the downward direction) onto workpiece becomes possible. The advantage of disposing an own linear guide or spindle sleeve in the pivotable motor spindle is that, independent of the pivot angle, a feed axis is provided with constant accuracy for the tool.

A further advantage is that the independent feed axis in the motor spindle also supports the tool changing process. To this end, one variation provides that the machine tool comprises a tool magazine having a tool changing device and that for the approach movement for exchanging the tool at the tool changing device, the motor spindle or the spindle sleeve is positioned along a linear guide parallel to the spindle axis in considerably smaller dimensioned and, for this reason, also less powerful actuator in the spindle sleeve or in the complete motor spindle (for example, the motor spindle is situated as a whole on a linear guide and is movable in the direction parallel to the spindle axis and not only a part of the tool spindle, as in the case of the spindle sleeve) enables to carry out a tool changing under low energy consumption. Since considerably smaller masses are to be moved, the changing process occurs faster and more gently.

In this instance, it is advantageous that the tool changing device is formed by a pivot arm movable by a pivot actuator, the pivot arm being movable and positionable along the first (Z) and/or the second (Y) linear axis by respectively one own actuator. Suitably, the linear axes, about which the pivot arm is longitudinally displaceable, are respectively parallel to the corresponding linear axes which are provided with reference to the motor spindle and/or the workpiece support. In doing so, a geometric arrangement is facilitated. In this instance, the tool magazine is located laterally (for example, viewed in the direction of X) next to the stand, as a result of which the pivot movement of the pivot arm provided at the tool changing device is facilitated for pivoting tools into or out of the tool magazine. The pivot arm itself has two grippers coupled to each other. As a rule, one gripper is empty for receiving the tool to be exchanged from the motor spindle and the second gripper carries the tool to be loaded.

A further variation provides that the turning bearing is formed in a fork- or claw-like manner by two turning bearing supports spaced apart and that the motor spindle or the spindle bed is situated between the turning bearing supports. The position of the tool and the workpiece is decisively important for accurate and efficient machining at the lowest possible reject rate. By configuring the turning bearing by means of two turning bearing supports spaced apart, a very stable structure, allowing for a corresponding high precision machining, is proposed for implementing the turning bearing.

Furthermore, it is advantageously provided that the turning bearing has an arc-shaped, in particular integrally formed clamping element, which is used for the purpose of fixing the clamping surface of the spindle bed at the clamping segment with aid of a clamping device. By means of the arc-shaped configuration of the clamping segment, a parallel running area of the clamping element for clamping is offered in any angle position of the rotation about the turning axis of the clamping surface provided at the spindle bed or motor spindle. Herefrom results that the pivoted motor spindle is stably and position-accurately fixed in any angular position. The integrally formed clamping segment offers a stable construction which also supports a position-accurate fixing.

Advantageously, it is provided that the turning bearing has a bearing counter element interacting with the spindle bed.

Furthermore, the proposal advantageously provides that at least one, preferably two screw ball drives actuatable by actuators are provided as turning actuators, which engage laterally at the spindle bed. Preferably, the screw ball drives are actuated by torque engines. In addition, direct drives are, of course, also available as turning actuators. In the case that two screw ball drives are provided, the spindle bed is located between these two screw ball drives. Herefrom results a very stable arrangement. The configuration as screw ball drives is advantageous because said screw ball drives are very stable and position accurate, especially when overlaying the movement about the turning axis and the linear movement.

Preferably, the first (Z), the second (Y) and the third (X) linear axis form a Cartesian system, meaning that these three axes are at right angles to one another in a clockwise-turning system. The turning bearing configures the first turning axis, which preferably is oriented perpendicular to the first linear axis (Z). The second linear axis (Y, in the vertical direction) is preferably oriented perpendicular to the first turning axis (A) and also oriented perpendicular to the first linear axis (Z). In a preferred embodiment of the proposal, it is provided that the second linear axis runs vertically.

A preferred embodiment of the proposal is formed by a machine tool for machining a work tool, the machine tool having a motor spindle for the rotative actuation of a tool about a spindle axis, and the motor spindle is supported by a stand, a turning bearing being provided at the stand, and the motor spindle mounted on a spindle bed is pivotable and positionable at the turning bearing about a first turning axis, and a linear guide being provided at the motor spindle, which enables an advancing movement of the tool parallel to the spindle axis, and the spindle bed is configured in a cage- or tunnel-like manner, in particular, in an integral or flexurally stable manner, the spindle bed having clamping surfaces at the spindle bed end lying opposite of the bearing element of the turning bearing, and the turning bearing has an arc-shaped, in particular, integrally molded clamping segment which is used for the purpose of fixing the clamping surface of the spindle bed at the clamping segment with aid of a clamping device.

This proposal is characterized by a high flexibility on the one hand but also, on the other hand, by a high stability because the turning bearing and the clamping surface are at a far distance from each other and, in this way, the arrangement is capable of accommodating very high machining forces while not at all compromising the high machining accuracy of such a configuration of the machine tool.

The drawings schematically illustrate the present invention in particular in one exemplary embodiment.

FIGS. 1a, b, 4a, 4b each show a three-dimensional view of the machine tool in different positions;

FIGS. 2, 5a, 5b show in a side view the machine tool in a further machining position;

FIG. 3 snows a frontal view onto machine tool (in the direction of the Z-axis according to FIG. 1a);

Figure 1A:
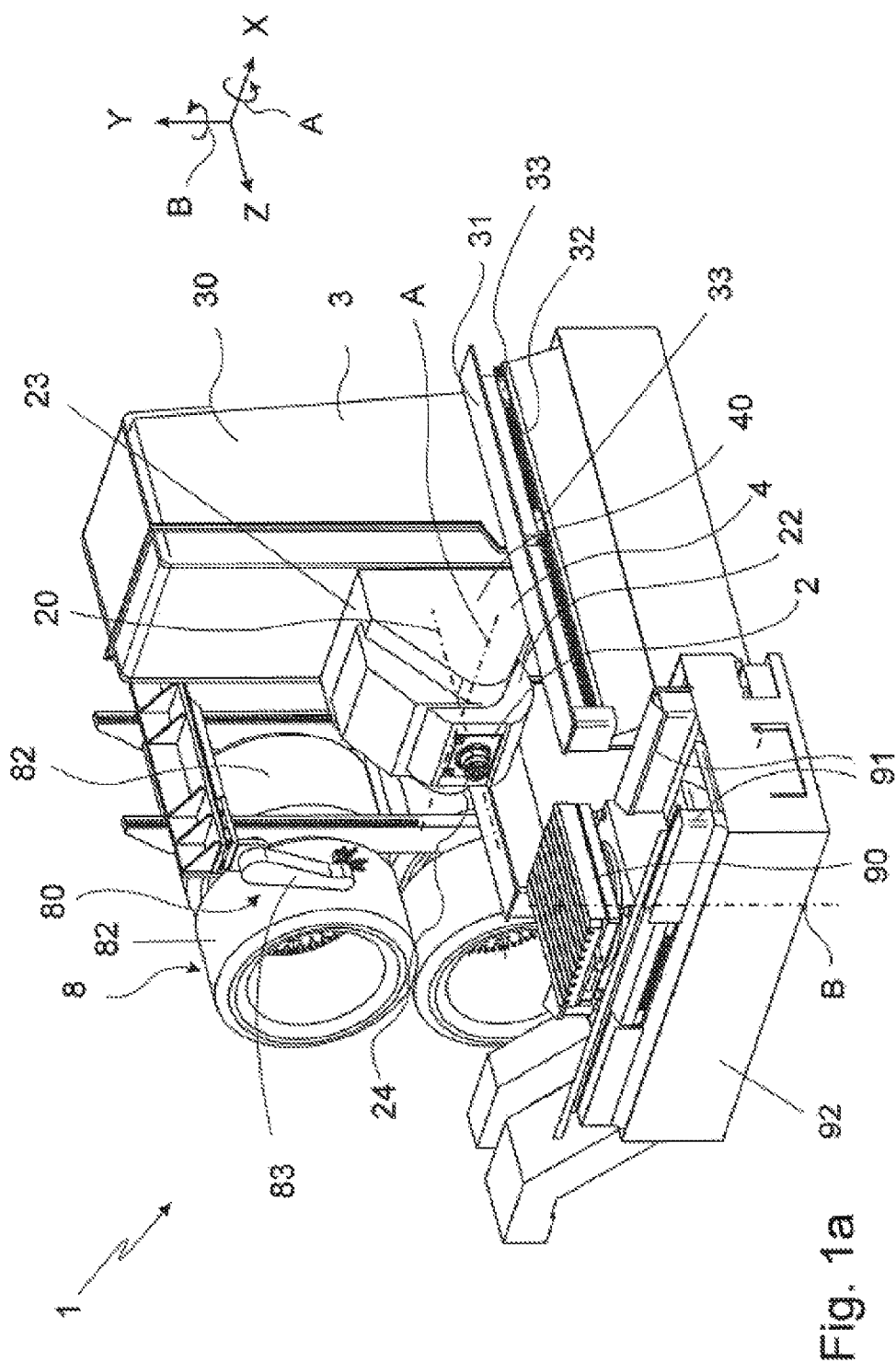

In the figures, the same or corresponding elements are referenced respectively by the same reference characters and, for this reason, are, unless relevant, not repeated. The disclosures included in the complete description are appropriately transferable to same parts having the same reference characters or the same component nomenclature. The positional information selected in the description, such as top, bottom, lateral, etc., are in reference to the directly described and illustrated figures and are to be appropriately transferred to the new position when the position is changed. Furthermore, individual features or combinations of features from those shown and described different exemplary embodiments can also illustrate independent, inventive solutions or solutions according to the present invention.

Machine tool 1 is shown in FIG. 1a, b in two different machining positions. Machine tool 1 is used for machining a workpiece 9 situated on a work piece support 90. Machine tool 1 comprises, inter alia, a motor spindle 2 for the rotative actuation of a tool about a spindle axis 20. Machine tool 1 has, inter alia, also a stand 3 supporting motor spindle 2. A turning bearing 4 is provided at stand 3, which forms a first turning axis A about which motor spindle 2 is pivotable and positionable.

In this instance, the geometric design is chosen in such a manner that turning axis A intersects with spindle axis 20, however, without limiting the present invention thereto.

In FIG. 1a, a labeled Cartesian coordinate system is indicated to the right next to machine tool 1, which illustrates the used nomenclature. This Cartesian system is primarily described by linear axes X, Y and Z, the Z-axis preferably running parallel and (for machines not having a pivotable motor spindle) is at least parallel to spindle axis 20 of motor spindle 2. In this application, linear axis Z is also described as first linear axis. The Y-axis is used as second linear axis and the X-axis is described as third linear axis.

Furthermore, the nomenclature also specifies the reference for the possible, different rotational axes A, B, a rotation about the Y-axis being referenced as rotation about the B-axis. Within the context of this application, such a rotation is at the same time also described as rotation about a second turning axis. A rotation or pivotability about the X-axis is also described as rotation about the A-axis; this corresponds, within the context of the disclosure of this application, also to a rotation about the first rotational axis. It is to be noted that a pivoting of motor spindle 2 about a first turning axis is provided, which is not limiting the present invention to that the turning axis is mandatorily parallel to a horizontally or vertically running spatial axis or linear axis. Categorically, it is possible to choose arrangements geometrically deviating therefrom, thus, to provide a first turning axis which, for example, encloses an acute angle with the X-axis, the Y-axis or the Z-axis. The present invention and disclosure also comprises these variations.

The allocation of the various linear axes shown in FIG. 1a, that is, the longitudinal mobility along the different spatial directions, is as follows.

Workpiece support 90 is movable and positionable along (horizontal or third) linear axis X. For this purpose, workpiece bed 92 is provided having two parallel running workpiece guides 91, which are oriented running parallel and in the X-direction. An adjustable and controllable actuator for workpiece support 90, which is correspondingly movable and accurately positionable on workpiece guides 91, is provided in workpiece bed 92.

In the exemplary embodiment shown here, a pivotability of workpiece support 90 about horizontally running second rotational axis B is also provided, which additionally enables a multi-sided machining and, for this reason, a more flexible machining of workpiece 9 by motor spindle 2. This is realized by a turntable, which is situated in displaceable workpiece support 90.

Stand. 3 is movable and positionable along a linear guide 31. For this purpose, linear guide 31 is formed by two parallel running guide tracks 32 via which stand. 3 is braced by means of stand feet 33. In this instance, the longitudinal extension of guide 31 is in the direction of first linear axis Z. At stand 3, motor spindle 2 is movable and positionable along a guide 30, guide 30 also being formed by guide rails, which here are not visible, and, more specifically, motor spindle 2 rests on this guide 30 via turning bearing 4. In this instance, this guide 30 extents longitudinally in the vertical direction, parallel to second linear axis Y.

The design of stand 3 is as follows.

Motor spindle slide 23 is provided on guide 30 of stand. 3 for the displaceability of the motor spindle in the direction of the Y-axis. In the exemplary embodiment shown here, motor spindle slide 23 is identical with turning bearing 4; in the here shown exemplary embodiment, this component has a plurality of tasks described by various terms. Turning bearing can also be fixed in place. Turning bearing 4 itself is made up of two fork-, bracket- or yoke-like arranged turning bearing supports 40, which form a solid and stable counter bearing for the rotary movement of motor spindle 2 and which in between each other accommodate and mount motor spindle 2 or spindle bed 22. Motor spindle 2 itself is mounted in a spindle bed 22, which holds the connections to the turning shaft forming turning axis A at turning bearing 4. Of course, it is possible to rotatably mount motor spindle 2 without situating a spindle bed 22 in turning bearing 4. The rotational actuator for pivoting motor spindle 2 about turning axis A of turning bearing 4 is, for example, located in turning bearing support 40 or on the sides of motor spindle 2 or of spindle bed 22.

Figure 3:
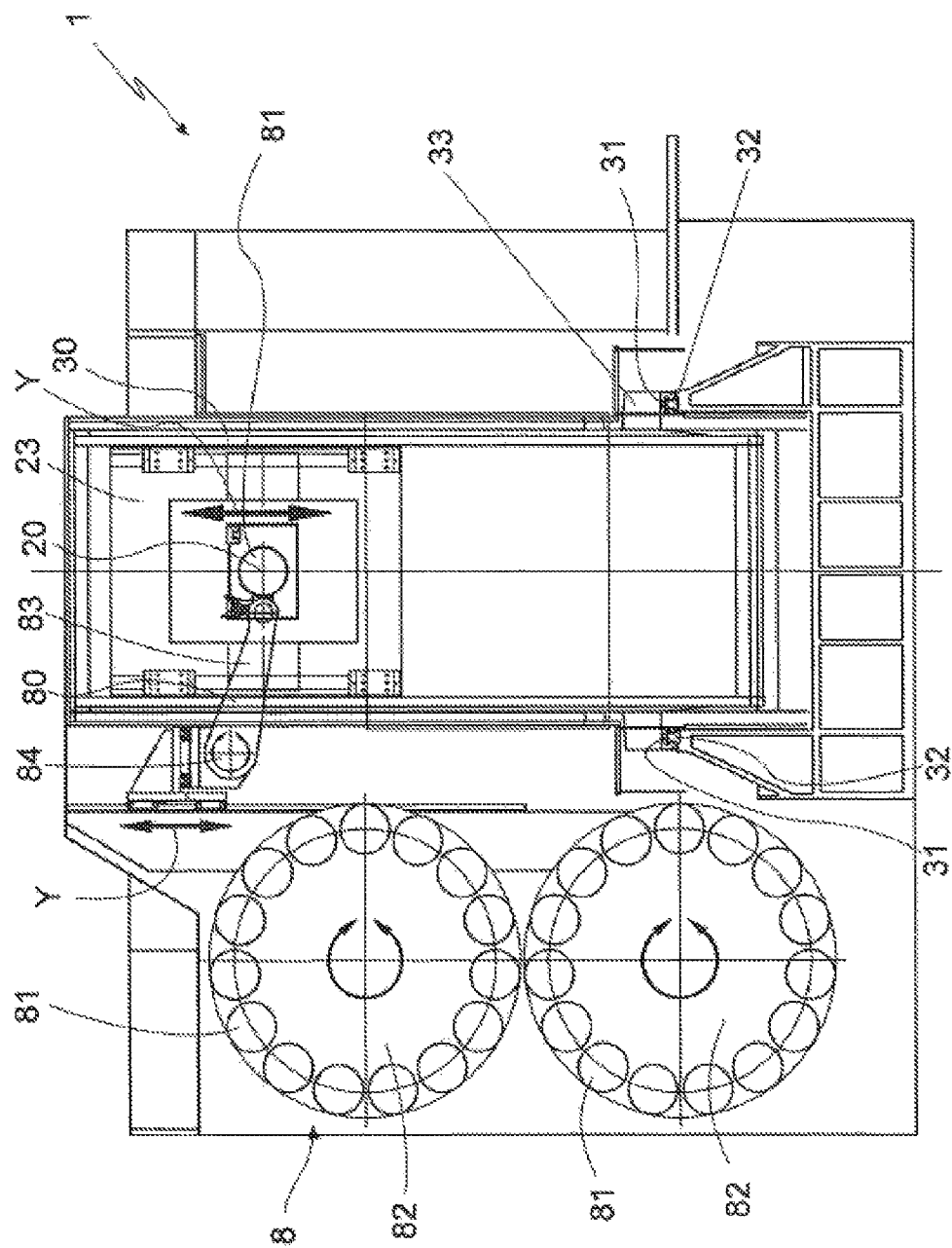

Motor spindle 2 has spindle head 24, which accommodates, clamps and rotatively actuates tool 81 (see FIG. 3) for machining purposes.

A substantial advantage of the proposal is in that, at machine tool 1, a comprehensive tool magazine 8 is provided which, in relation to motor spindle 2, is located laterally next to motor spindle 2 in stand 3.

Tool magazine 8 is formed by a plurality of tool magazine disks 82, which are arrangeable one above the other or one behind the other; in the embodiment shown here (FIG. 1*a*), four tool magazine disks 82 in total are provided, two tool magazine disks 82 being arranged one above the other and thereof two rows being arranged one behind the other. In this way, it is possible to keep a large stock of tools 81 in tool magazine 8. In order to load or exchange tools 81 into and from spindle head 24 of motor spindle 2, a tool changing device 80 is provided. Said tool changing device is made up of a pivot arm 83 which is pivotable about a pivot axis 84 parallel to the Z-axis. At the same time, pivot arm 83 is movable and positionable in the Y-direction (see double arrows in FIG. 3); a special actuator is provided for this purpose. Furthermore, in order to reach the two tool magazine disks 82 arranged one behind the other, a mobility of pivot arm 83 in the Z-direction is also provided. The vertical displaceability of the tool changing device enables that pivot arm 83 reaches the lower as well as the upper tool magazine disk 82 for mounting or removing tool 81.

Figure 1B:
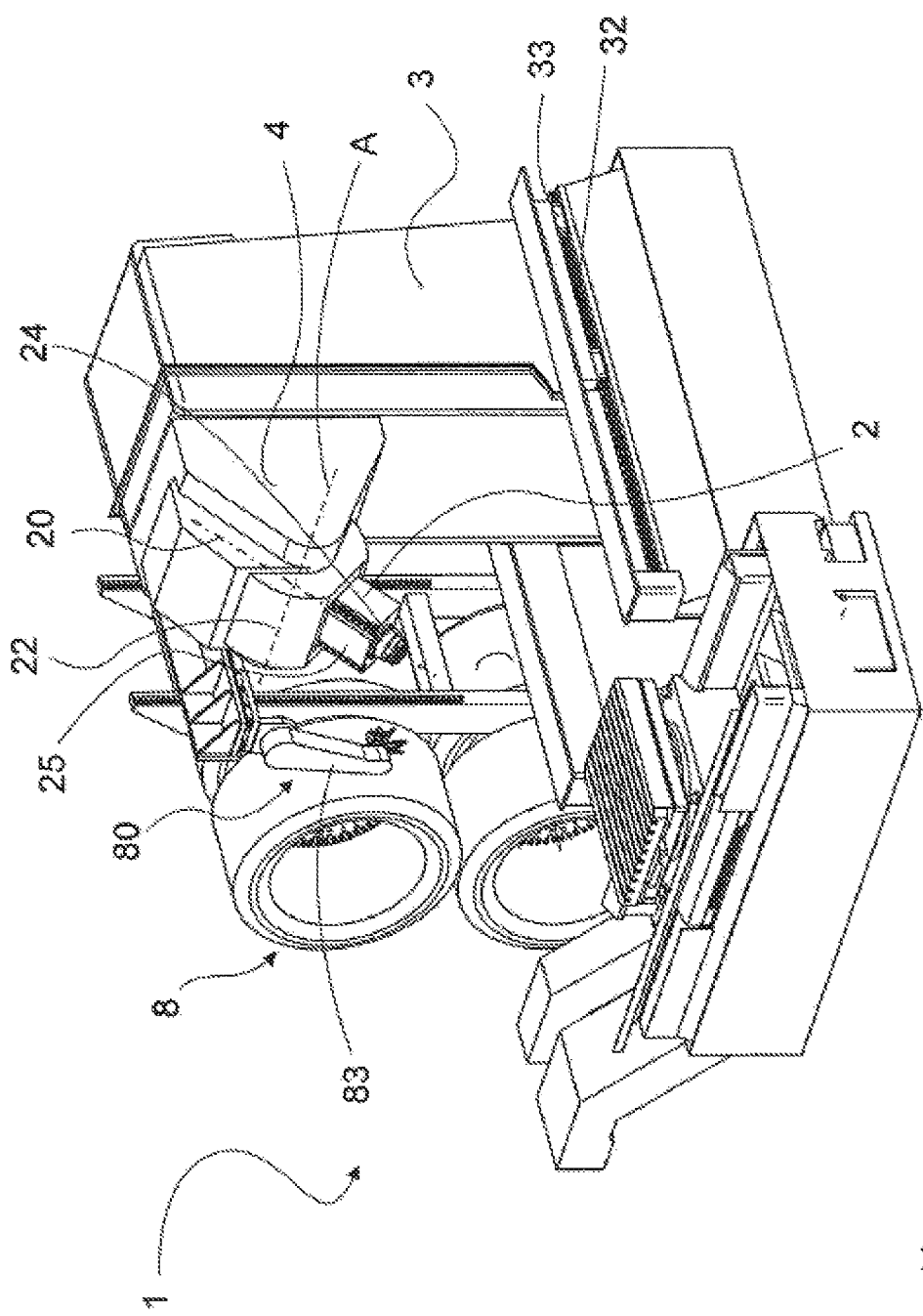

FIG. 1*b* shows machine tool 1 in a different position of use.

First, the position of turning bearing 4 at stand 3 is changed, namely, turning bearing 4 is moved completely upwards. Furthermore, motor spindle 2 is pivoted about the first rotational axis or turning axis A in such a manner that spindle axis 20 encloses an acute angle with the horizontal and motor spindle 2 or its head. 24 points downwards. This position enables a machining at workpiece 9 from the top to the bottom under an oblique angle up to an upper limit angle.

Furthermore, it can be clearly seen that front end. 25 of motor spindle 2 is extended from spindle bed 22. At motor spindle 2, linear guide 21 (compare FIG. 2) is provided which, with motor spindle 2, is pivotable and positionable about the first turning axis A and enables an advancing movement of tool 81 parallel to spindle axis 20. This linear guide 21 is implementable in different manners. In a first variation, complete motor spindle 2 is mounted at a linear guide 21 and is longitudinally displaceable vis-à-vis spindle bed 22 (or turning bearing 4). In a second variation, a linear guide is provided in motor spindle 2, which, for example, leads to the peakedness of a spindle sleeve in which the drive shaft is thus pushed forward out of motor spindle 2.

Both proposals achieve that, in a motor spindle 2 pivoting about turning axis A, a feed in the direction of the spindle axis (pivoted about turning axis A) is available and this simply designed linear actuator serves an approach movement of tool 81 interacting with the workpiece.

Instead of having to tilt the possible very heavy workpiece weighing, for example, several tons, about a turning axis A, the considerably lighter motor spindle 2 is now inclined about first turning axis A to carry out a respective drilling or other machining of the workpiece.

The displaceability of motor spindle 2 or of a part of motor spindle 2 along linear guide 21 is not, however, only advantageous for efficient and fast machining; it can also be used in the tool changing process when, for example, a retracting motion is to be imprinted into spindle 24 to retract the tool shaft from spindle head 24. Here also, this additional linear axis is advantageous because actuators can be designed considerably smaller and, for this reason, are also more cost effective during operation.

The pivoting shown in FIG. 1*b*, in this instance occurs in a pivot range having positive signs and can reach up to 100° or 110° relative to the horizontal, without the present invention being limited hereto.

Figure 2:
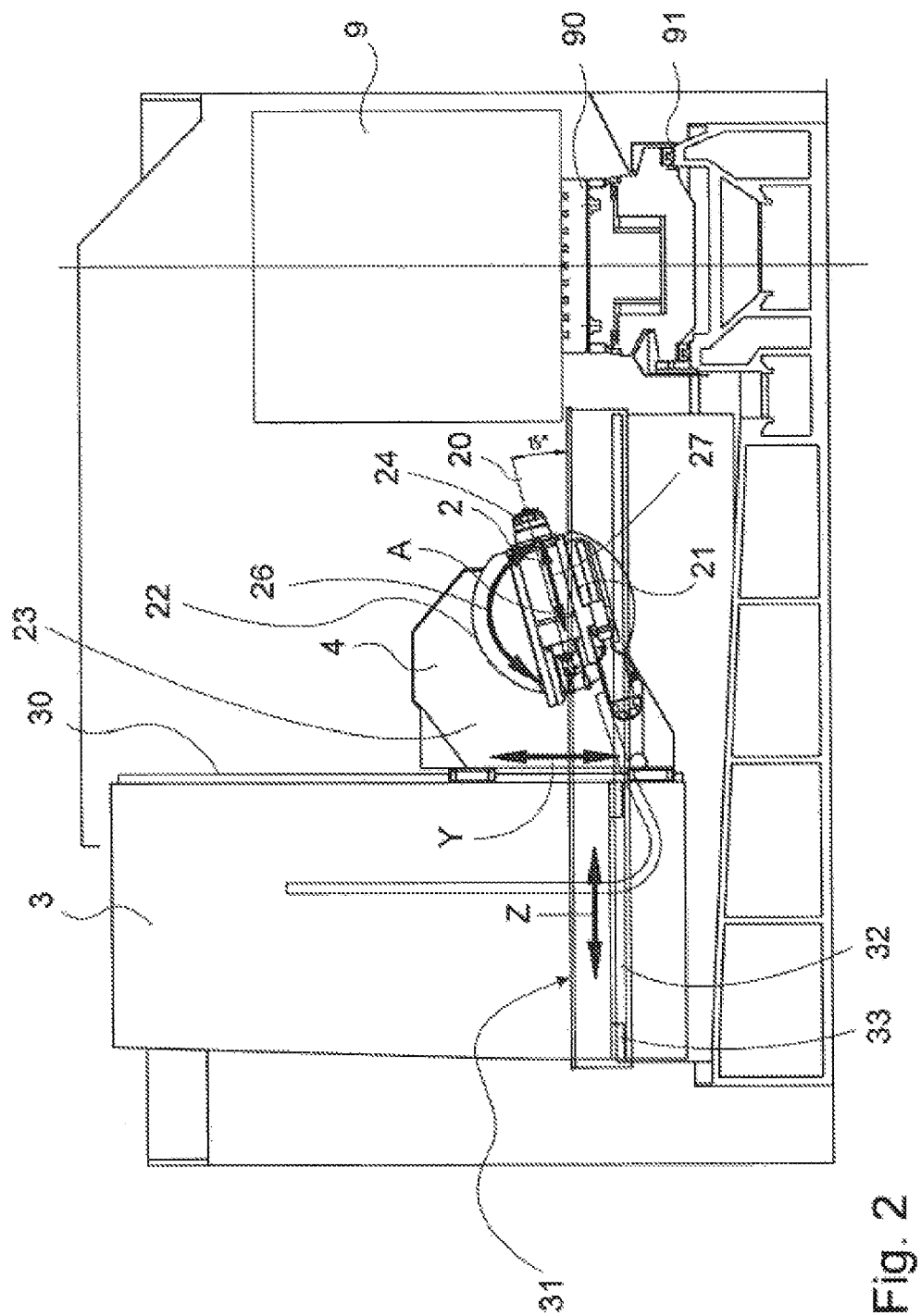

In contrast, FIG. 2 shows a pivoting into the negative range in such a manner that spindle head is inclined in the upward direction.

Double arrow 27 indicates the bidirectional displaceability of motor spindle 2 or parts of motor spindle 2 along linear guide 21. This results into a respective approach movement of spindle head 24 in the direction of workpiece 9. The rotatability of spindle bed 22 together with motor spindle 2 about turning axis A is shown by double arrow 26.

It can be clearly seen from FIG. 2 that by the proposal of introducing drilling and other machining processes proceeding from diagonally below to diagonally above, spindle axis 20 and, thus, also spindle are rotated about horizontally oriented turning axis A into the negative angular region. Since spindle head 24 lies higher than the center of gravity of motor spindle 2 or of its turning axis A, it is advantageous to configure the arrangement in such a manner that motor spindle 2 is displaceable very far downwards relative to workpiece 9. This is made possible by the special arrangement of the respective guides; for this purpose, please see FIG. 3. It can be clearly seen that motor spindle slides 23 can slide through downwards between two guide rails 32 of guide 31 of stand 3 and, in this way, make room for carrying out respective machining also in the lower area of workpiece 9. This is in particular realized in that guide rails 32 in stand 3, which support or brace motor spindle slide 23, have a smaller distance to each other than guide rails 32 bracing stand. 3 via stand feet 33, which also are situated laterally at stand 3.

Figure 4A:
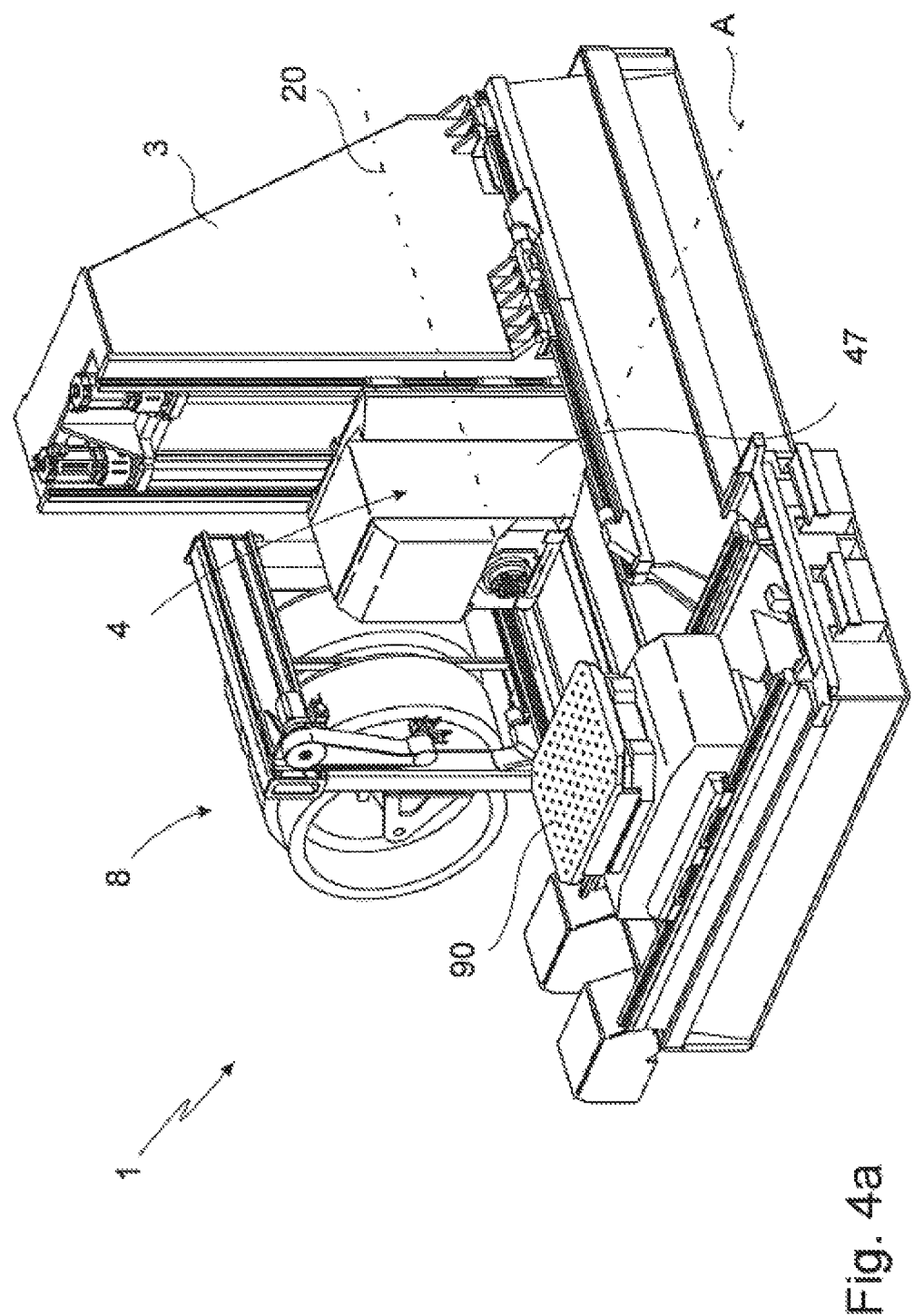

FIG. 4*a* substantially shows the same shown in FIG. 1*a*. In the exemplary embodiment shown here, the turning bearing supports are hidden by a covering 47. A further difference to the illustration according to FIG. 1*a* is the arrangement of turning axis A vis-à-vis the spindle axis 20 which, as here illustrated, is implemented below spindle axis 20.

Figure 4B:
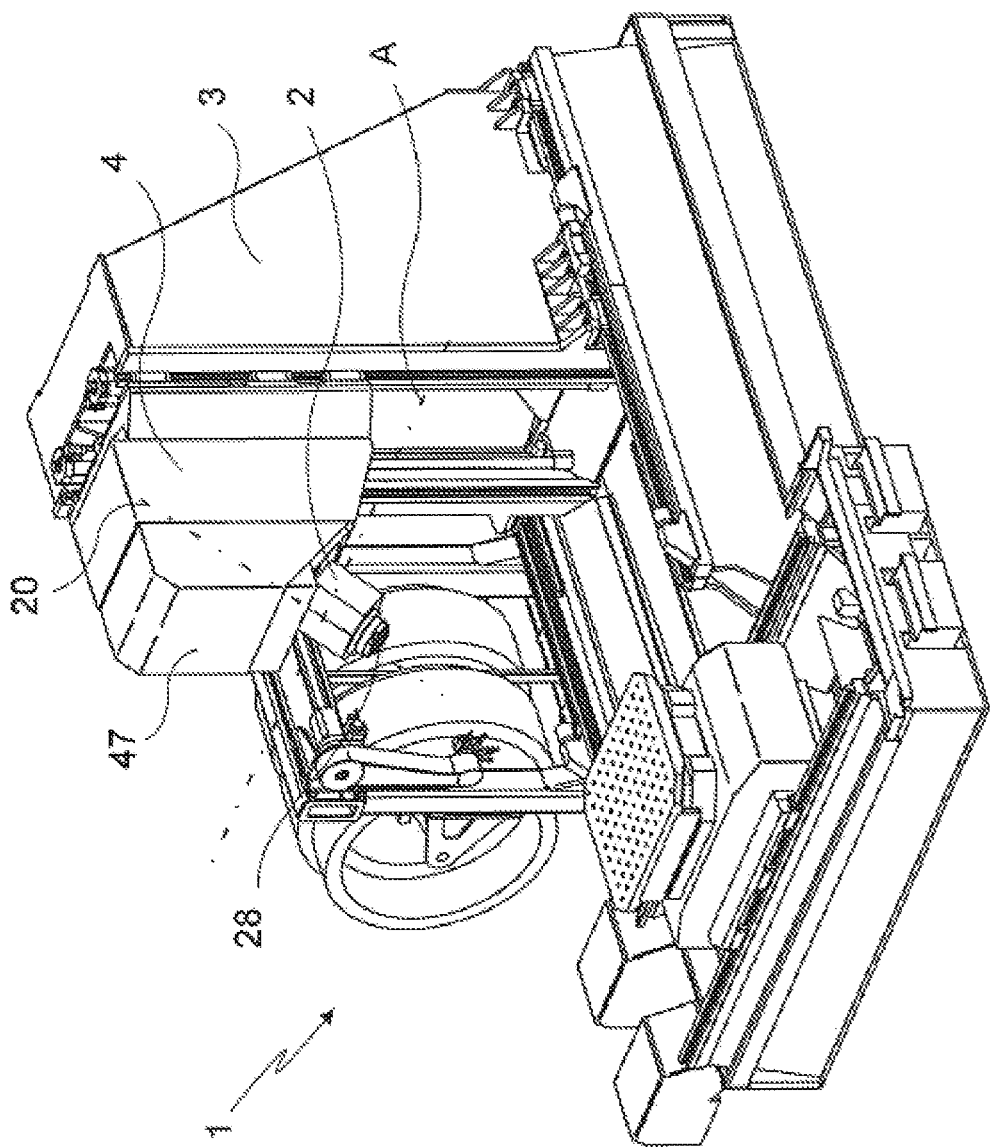

FIG. 4*b* is comparable to FIG. 1*b*. Similarly as in FIG. 1*b*, in FIG. 4*b*, turning bearing 4 is pushed up vertically in the upward direction at stand 3. Furthermore, spindle axis 20 is also pivoted vis-à-vis the orientation according to FIG. 4*a* in such a manner that the front end of motor spindle 2 supporting tool holder 28 is pivoted downwards. It also can be clearly seen that, in FIG. 4*b*, the front end of motor spindle 2 is, vis-à-vis the situation according to FIG. 4*a*, pushed forward out of housing 47; this is achieved in that a linear guide is provided which enables a linear movement of tool holder 28 parallel to spindle axis 20. It is evident that tool holder 28 accommodates the not-shown tool and firmly holds said tool during machining.

The situation shown in FIG. 5*a* is comparable to the situation shown in FIG. 2. Different from FIG. 2, it can be clearly seen in FIG. 5*a* that turning axis A runs below spindle axis 20, even though spindle axis 20 is here not horizontal but slightly inclined diagonally upwards. Conspicuous in FIG. 5*a* (compared to FIG. 2) is also the embodiment of an arc-shaped clamping segment 41 at turning bearing 4. This design engineering detail will be described within the context of FIG. 6.

Figure 5B:
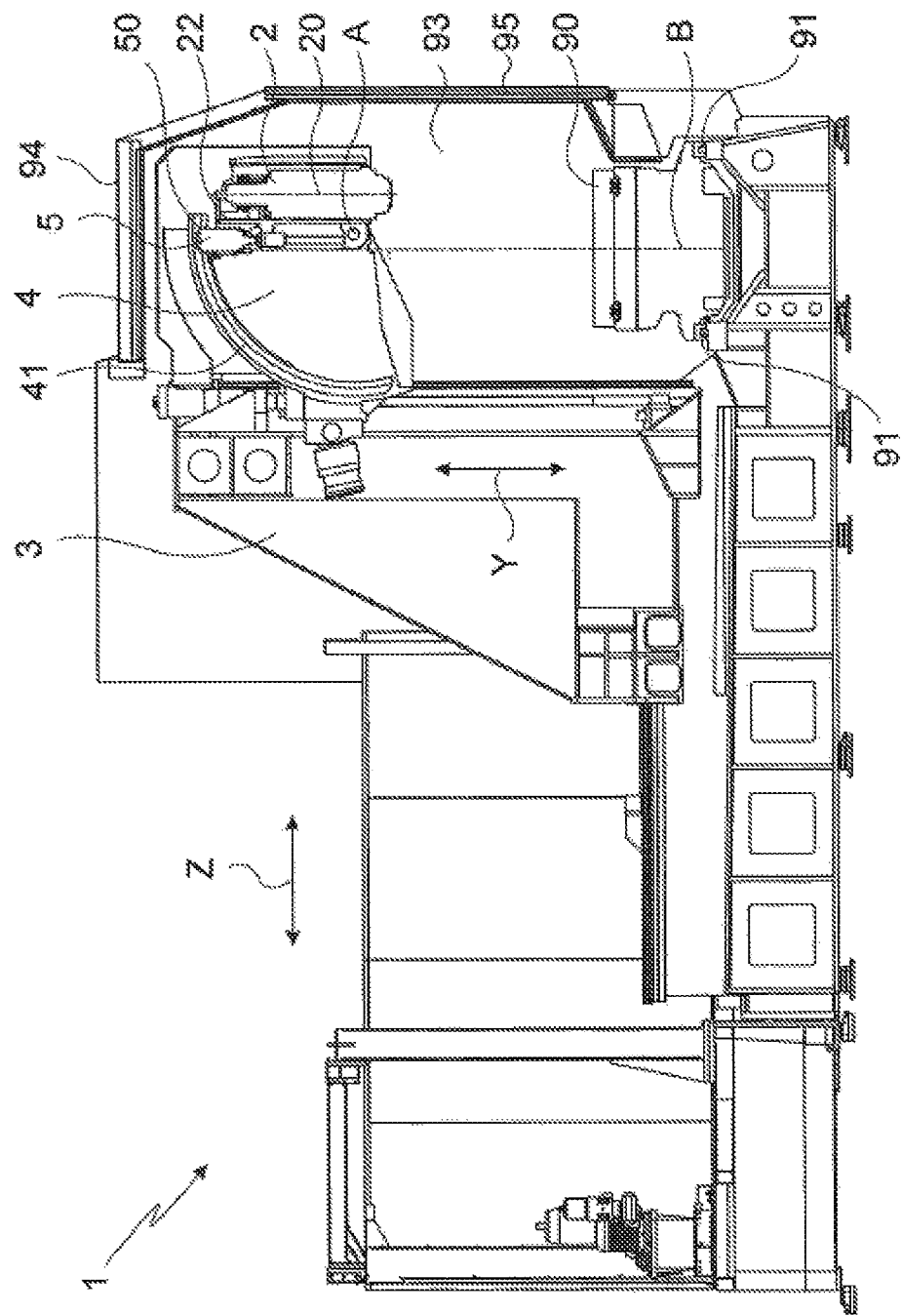

Compared to FIG. 5*a*, FIG. 5*b* shows, on the one hand, stand 3, which is slid in the Z-direction entirely forward, in such a manner that turning bearing 4 is positioned above workpiece support 90. In this instance, motor spindle 2 is pivoted about turning axis A into a vertical position; a workpiece 9 resting on workpiece support 90 could be machined from above.

Machine tool 1 shown in FIG. 5*b* is here also entirely shown having a housing 94 closing off machining space 93;

of course, housing 94 has at least one door 95 for in- and out-transporting workpieces 9. In the bottom area of machine tool 1, in particular, below workpiece support 90, a chip receptacle or chip conveyor is located between the two workpiece guides 91.

The configuration of the turning actuator will be described in FIG. 6. In order to accurately align motor spindle 2 at turning bearing 4, a clamping device 5, a clamping surface 50 and an arc-shaped clamping segment 41 interact. Arc-shaped clamping segment 41 is fixedly and stably, preferably as one piece, implemented at turning bearing 4 and is used to fix with high precision accuracy clamping surface 50, provided at motor spindle 2 or spindle bed 22 accommodating motor spindle 2, with aid of clamping device 5.

In the exemplary embodiment shown in FIG. 5*b*, one succeeds in machining workpiece areas in the forward position of motor spindle 2, which rest on the half of workpiece support 90 facing away from the stand, from above. This is achieved in that spindle axis 20 does not intersect turning axis A but that turning axis A is situated in the horizontal position of spindle axis 20 below the same.

Figure 6:
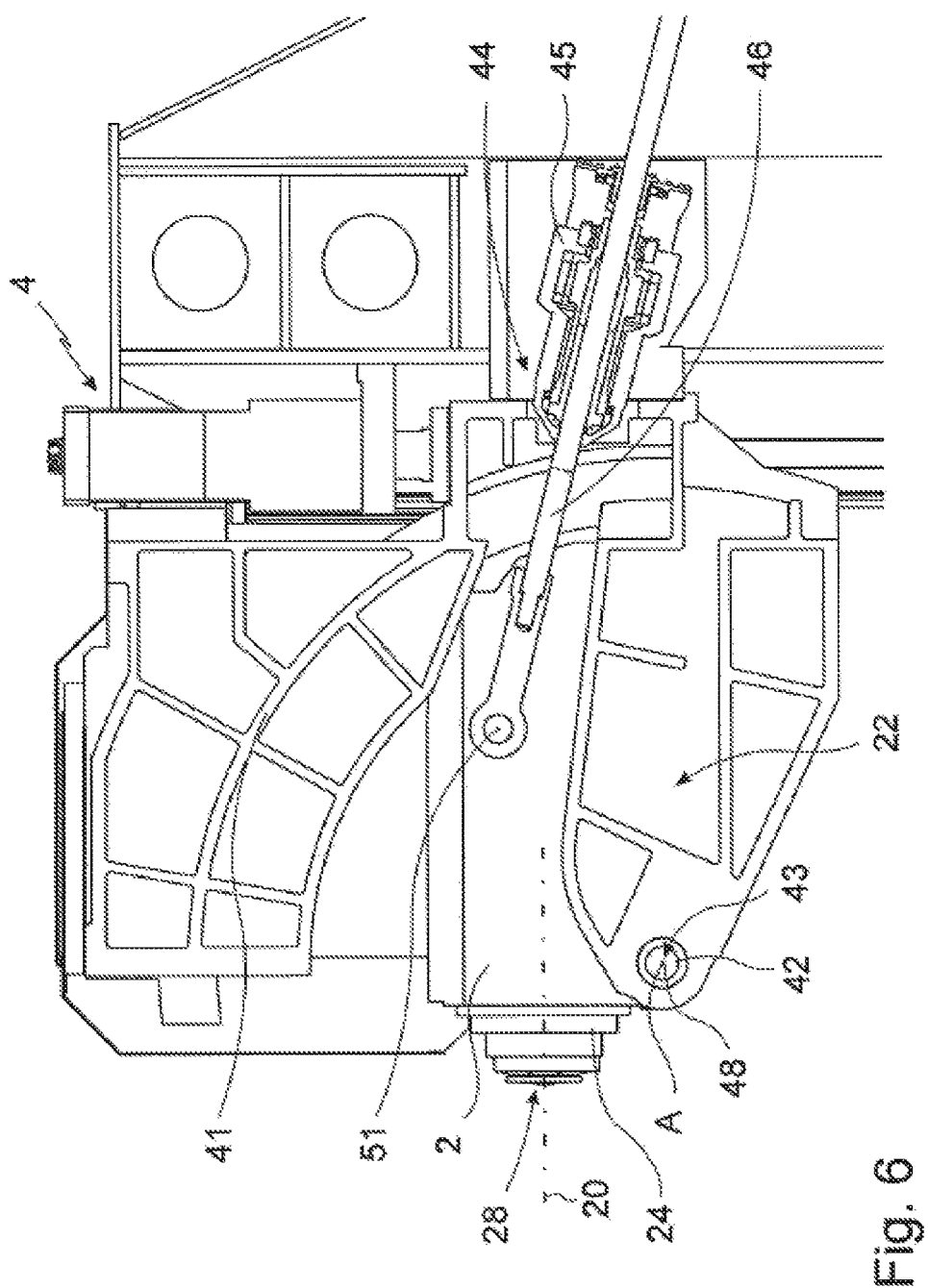
FIG. 6 shows an enlarged detail of the bearing of the motor spindle of the machine tool in a side view.
Figure 7:
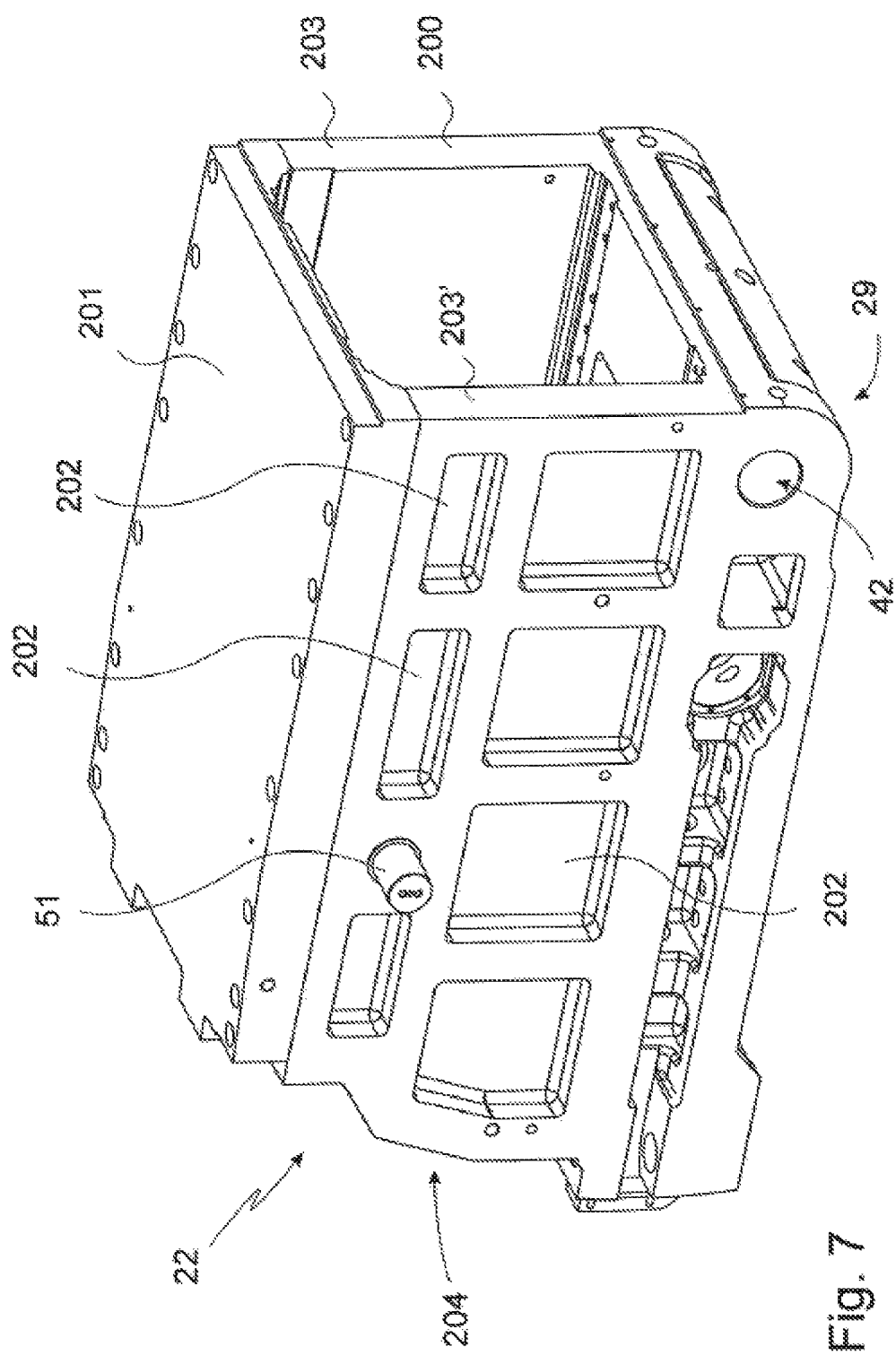
FIG. 7 shows an implementation variation of the spindle bed of a machine tool in a three-dimensional view.

FIG. 6 shows in an enlarged detail the configuration of motor spindle 2 kept in spindle bed 22. FIG. 7 shows an exemplary embodiment of spindle bed 22 in an enlarged detail.

Spindle bed 22 is formed in a tunnel like manner; it is open at its end faces (with reference to spindle axis 20 not shown here) and is preferably formed from two parts, the first part, base part 200, formed in a U-shape in the direction of the spindle axis or perpendicular to the opening, is preferably made from one piece to ensure a high stability and which is closed off on the top by a lid part 201. In this instance, lid part 201 connects two webs 203, 203' of U-shaped base part 200. At the front spindle bed end 29, a bearing element 42 is provided in the lower area in base art 200, which here, for example, is configured as a penetrating opening for accommodating a turn pin or shaft, which is not shown. At the end 204 lying opposite of spindle bed end 29, clamping surface 50 is provided, which interacts with clamping segment 41 and clamping device 5 in order to save weight, base part 200 has a plurality of openings 202 without reducing the overall stability and stiffness of base part 200 and of spindle bed 22. Bearing element 42 is situated below motor spindle 2. In the upper region, in the last third, quarter or fifth of the web height of base part 200, at least one pivot point 51 is located in the rear area, allocated to rear end 28 or to its last third or quarter or fifth, at which turning actuator 44 (see FIG. 6) engages.

In FIG. 6, turning axis A is implemented in turning pin 48 connecting bearing element 42 with bearing counter element 43. As already configured, spindle bed 22 has bearing element 42, which interacts with bearing counter element 43 provided at turning bearing 4 and with aid of turning pin 47. Here it can also be clearly seen that turning axis A runs below spindle axis 20. Pivot point 51 is located above spindle axis 20. A rod of turning actuator 44 engages at this pivot point 51. Turning actuator 44 affects that motor spindle 2 is rotatable and fixable about turning axis A in a controllable, position accurate and highly stable manner. Preferably, the turning actuator is implemented by a screw ball drive 46, which is actuated by an actuation motor or actuator 45, and, in this way, exercises a linear movement, which pivots pivot point 51 about turning axis A.

The following is a summary of the individual, preferred aspects of the present invention. These aspects include (individually or in combination) that the motor spindle (2) is pivotable and positional at the turning bearing (4) about a first turning axis (A) by a controllable turning actuator (44);

a linear guide (21) is provided at the motor spindle (2) which enables a linear movement of the tool parallel to the spindle axis (20) by a controllable linear actuator;

an over of rotary movement and linear movement is provided during machining;

when the spindle axis (20) is horizontally aligned, the turning axis (A) of the turning bearing (4) is located below the spindle axis (20);

the turning axis (A) is located in the vicinity of the tool holder of the retracted motor spindle (2);

a guide (30) or a double guide for the turning bearing (4) is provided at the stand (3) in the direction of a particularly vertically running second linear axis (Y), and that the turning bearing (4) is movable and positionable along this guide (30) or a double guide;

the stand (3) is formed by two stand parts spaced apart and that the turning bearing (4) is synchronously movable and positionable on guides of the stand parts via guide slide;

the turning bearing (4) is situated between the two stand parts or between the single guides of the double guide;

the stand (3) is movable and positionable along a guide (31) describing a first linear axis (Z);

the machine tool (1) has a stand guide along a third linear axis (X) for positioning the stand (3);

the machine tool (1) has a workpiece support (90) and that the workpiece support (90) is movable and positionable along a workpiece guide (91) describing a third linear axis (K) and/or along a workpiece guide describing a first linear axis (Z);

the workpiece support (90) is rotatable and positionable about a second turning axis (B);

the motor spindle (2) has a spindle sleeve which is mounted on the linear guide (21) in the direction of the spindle axis (20) and which is displaceable and positionable vis-à-vis the motor spindle housing;

next to the motor spindle (2), at least one further motor spindle is situated, which is pivotable and positionable at the turning bearing (4) about the first turning axis (A);

the respective spindle axes of the at least two motor spindles are oriented parallel to each other;

an adjusting device is provided to adjust the distance between the motor spindles;

a spindle bed (22) pivotable and positionable about the first turning axis (A) is provided at the turning bearing (4) and that the motor spindle (2) is mounted via the linear guide (21) in the direction of the spindle axis (20) on or at the spindle bed (22);

the spindle bed accommodates at least two motor spindles;

a common linear actuator is provided for the at least two motor spindles or that for each of the at least two motor spindles respectively one own linear actuator provided;

the spindle bed (22) is configured in a cage- or tunnel-like manner, in particular, in an integral or flexurally stable manner;

the bearing element (42) of the turning bearing (4) is situated at the front, in particular, lower spindle bed end (29);

the spindle bed (22) has a clamping surface at the spindle bed end lying opposite of the bearing element (42);

a center position of the spindle axis (20) pivotable about the turning axis (A) of the turning bearing (4), in which the spindle axis (20) is parallel to the first linear axis (Z) and is pivotable and positionable in a pivot range of −25° to +100°, preferably of −20 to +95°, particularly preferably of −15° to +20° vis-à-vis this center position;

the machine tool (1) comprises a tool magazine (8) having a tool changing device (80) and that for the approach movement of the motor spindle (2) for changing the tool at the tool changing device (80), the motor spindle (2) or the spindle sleeve is positioned along the linear guide (21) parallel to the spindle axis is used;

the tool changing device (80) is formed by a pivot arm movable by a pivot, actuator and that the pivot arm is movable and positionable along the first (Z) and/or the second (Y) linear axis by an actuator;

the turning bearing (4) is formed in a fork or claw-like manner by two turning bearing supports (40) spaced apart and that the motor spindle or the spindle bed is situated between the turning bearing supports (40);

the turning bearing (4) has an arc-shaped, in particular integrally molded clamping segment (41), which is used for the purpose of fixing the clamping surface (50) of the spindle bed (22) at the clamping segment (41) with aid of a clamping device (5);

the turning bearing (4) has a bearing counter element (43) interacting with the bearing element (42) of the spindle bed (22);

at least one, preferably two screw ball drives (416) respectively actuatable by one actuator (45), which engage laterally of the spindle bed (22), are provided as turning actuator (44);

the first linear axis (Z) is oriented perpendicular to the first turning axis (A);

the second linear axis (Y) is oriented perpendicular to the first linear axis (Z) and to the first turning axis (A);

the first (Z), the second (Y) and the third (X) linear axes form a Cartesian system;

the second linear axis (Y) runs parallel;

the turning axis (A) and the spindle axis (20) are oriented, at an angle, in particular, at an acute or right angle (at least in a projection or viewing direction; it is not mandatory that the axes intersect) to each other.

The claims submitted now with the application, and any claims filed at a later point in time, are without prejudice for seeking broader protection.

If upon closer examination, in particular also of the relevant prior art, it results that one or other features are advantageous for the object of the present invention, however, are not decisively important, a wording no longer comprising such a feature, particularly in the independent claim, is, of course, already now pursued. The disclosure of this application covers also such a subcombination.

Furthermore, it shall be noted that the configurations and variations of the present invention described in the various embodiments and shown in the figures are arbitrarily combinable. For this purpose, individual or a plurality of features are arbitrarily exchangeable. Likewise, these feature combinations are also disclosed.

The back references recited in the dependent claims point, by way of the features of the respective dependent claim, to the further development of the subject matter of the independent claim. These back references are, however, not to be construed as a waiver for seeking independent, actual protection for the features of the back-referenced dependent claims.

Features, which are only disclosed in the description or also individual features from claims comprising a plurality of features, may be adopted in the independent claim(s) at any time as being of substantial relevance pertaining to the present invention for a distinction from the prior art and, that is, even when such features have been mentioned in connection with other features or when particularly advantageous results have been achieved in connection with other features.

What is claimed is:

1. A machine tool for machining a workpiece comprising: a motor spindle for the rotative actuation of a tool about a spindle axis, and the motor spindle is supported by a stand, wherein a turning bearing is provided at the stand, and the motor spindle at the turning bearing is pivotable and positionable about a first turning axis, and a linear guide is provided at the motor spindle, which enables an advancing linear movement of the tool parallel to the spindle axis, further comprising a spindle bed, pivotable and positionable about the first turning axis, provided at the turning bearing, and wherein the motor spindle is mounted via the linear guide in the direction of the spindle axis on or at the spindle bed, wherein the turning bearing is formed in a shape of a fork or a claw by two turning bearing supports spaced apart, and the motor spindle or the spindle bed is situated between the turning bearing supports, and the turning bearing has an arc-shaped clamping surface of the spindle bed at the clamping segment with aid of a clamping device.

2. The machine tool according to claim 1, wherein the motor spindle is pivotable and positional at the turning bearing about a first turning axis by a controllable turning actuator.

3. The machine tool according to claim 1, wherein an overlaying of the rotative actuation and the linear movement is provided during machining.

4. The machine tool according to claim 1, wherein, when the spindle axis is horizontally aligned, the turning axis of the turning bearing is located below the spindle axis.

5. The machine tool according to claim 1, wherein the turning axis is located in the vicinity of a tool holder of the motor spindle when retracted.

6. The machine tool according to claim 1, wherein the turning axis and the spindle axis are oriented at at least one of an angle with respect to each other, and a right angle with respect to each other.

7. The machine tool according to claim 1, wherein the motor spindle has a spindle sleeve which is mounted on the linear guide in a direction of the spindle axis and which is displaceable and positionable with respect to the motor spindle housing.

8. The machine tool according to claim 1, wherein the spindle bed is configured in a shape of a cage or a tunnel.

9. The machine tool according to claim 1, wherein the spindle axis, that is pivotable about the turning axis of the turning bearing, in which the spindle axis is parallel to the first linear axis and is pivotable and positionable in a pivot range of −25° to +100° with respect to the center position.

10. The machine tool according claim 1, wherein the turning bearing has a bearing counter element interacting with a bearing element of the spindle bed, and/or the spindle bed is driven by at least one screw ball drive actuable by an actuator, which engages laterally at the spindle bed that defines a turning actuator.

11. A machine tool for machining a work tool comprising: a motor spindle for the rotative actuation of a tool about a spindle axis, wherein the motor spindle is supported by a stand, and wherein a turning bearing is provided at the stand, and the motor spindle is mounted on a spindle bed and is pivotable and positionable at the turning bearing about a first turning axis; and a linear guide at the motor spindle, which enables an advancing movement of the tool parallel to the spindle axis, wherein the spindle bed is configured in a shape of a cage or a tunnel, wherein the spindle bed has clamping surfaces at the spindle bed end lying opposite of a bearing element of the turning bearing, and the turning bearing has an arc-shaped clamping segment to fix the clamping surface of the spindle bed at the clamping segment with aid of a clamping device.

12. The machine tool according to claim 11, wherein the spindle bed is configured in an integral or flexurally stable manner.

13. The machine tool according to claim 11, wherein the clamping segment is integrally molded with the turning bearing.

14. The machine tool according to claim 1, wherein the spindle bed has a clamping surface at the spindle bed end lying opposite of the bearing element.

15. The machine tool according to claim 1, wherein a bearing element of the turning bearing is situated at the front spindle bed end.

* * * * *